United States Patent [19]
Arrington, Jr. et al.

[11] Patent Number: 5,918,176
[45] Date of Patent: Jun. 29, 1999

[54] METHOD AND APPARATUS FOR CONTROLLING LINK QUALITY IN A WIRELESS COMMUNICATION SYSTEM

[75] Inventors: Arthur Edward Arrington, Jr., Gilbert; Shawn Wesley Hogberg, Chandler; Dennis Wayne Rebertus, Mesa, all of Ariz.

[73] Assignee: Motorola, Inc., Schaumburg, Ill.

[21] Appl. No.: 08/652,219

[22] Filed: May 23, 1996

[51] Int. Cl.⁶ .......................................... H04Q 7/36
[52] U.S. Cl. ..................... 455/430; 455/436; 455/456
[58] Field of Search .................... 455/436, 522, 455/427, 428, 430, 450, 552, 12.1, 456, 69, 440, 422, 517, 429, 13.1, 13.4, 404; 342/450, 457; 340/425.5, 426, 990

[56] References Cited

U.S. PATENT DOCUMENTS

| | | | |
|---|---|---|---|
| 4,613,990 | 9/1986 | Halpern | 455/69 |
| 5,218,367 | 6/1993 | Sheffer et al. | 455/456 |
| 5,365,451 | 11/1994 | Wang et al. | 342/357 |
| 5,375,123 | 12/1994 | Andersson et al. | 370/336 |
| 5,422,647 | 6/1995 | Hirshfield et al. | 342/354 |
| 5,574,983 | 11/1996 | Douzono et al. | 455/69 |
| 5,574,984 | 11/1996 | Reed et al. | 455/69 |
| 5,613,218 | 3/1997 | Li et al. | 455/71 |
| 5,619,525 | 4/1997 | Wiedeman et al. | 455/13.4 |
| 5,625,668 | 4/1997 | Loomis et al. | 455/456 |
| 5,742,666 | 4/1998 | Alpert | 455/404 |

*Primary Examiner*—Dwayne D. Bost
*Assistant Examiner*—Jean A. Gelin
*Attorney, Agent, or Firm*—Sherry J. Whitney; Frank J. Bogacz

[57] ABSTRACT

A control facility (130) within a wireless communication system receives, from a communication unit (120) (CU), a power measurement (306) of a signal (150) projected by a transceiver node (102). The power measurement (306) can be associated with location information (304) for the CU (120) and a time stamp (302). The control facility (130) uses this information to determine whether the CU (120) is being provided with a signal (150) having an acceptable link margin. If not, the control facility mitigates (408, 508, 512, 514, 518, 520) the effects of the unacceptable link margin, if possible. When power measurements (306) are received from multiple CUs (120), the control facility (130) can use the measurements (306) to create (402, 502) a link margin map which correlates CU location (304) with power measurements (306). The map is used to analyze the link margins within the system.

13 Claims, 6 Drawing Sheets

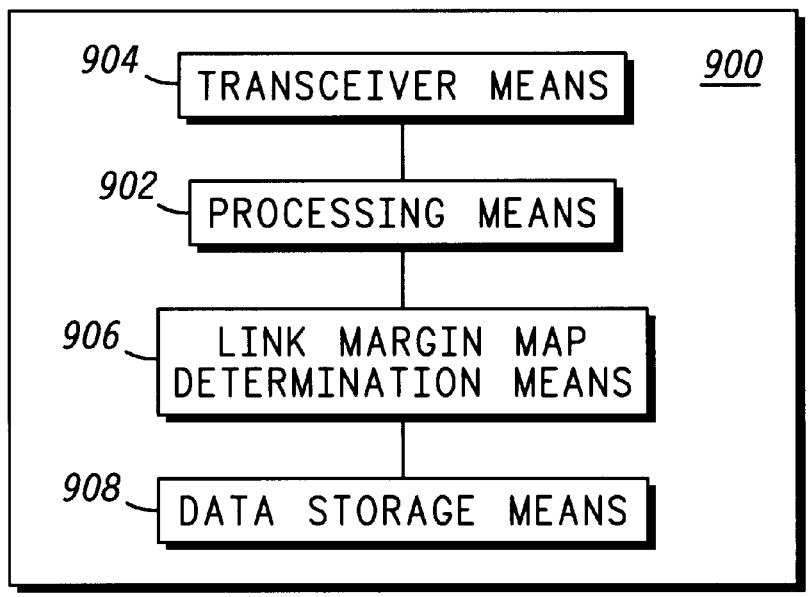
FIG. 9
FIG. 10
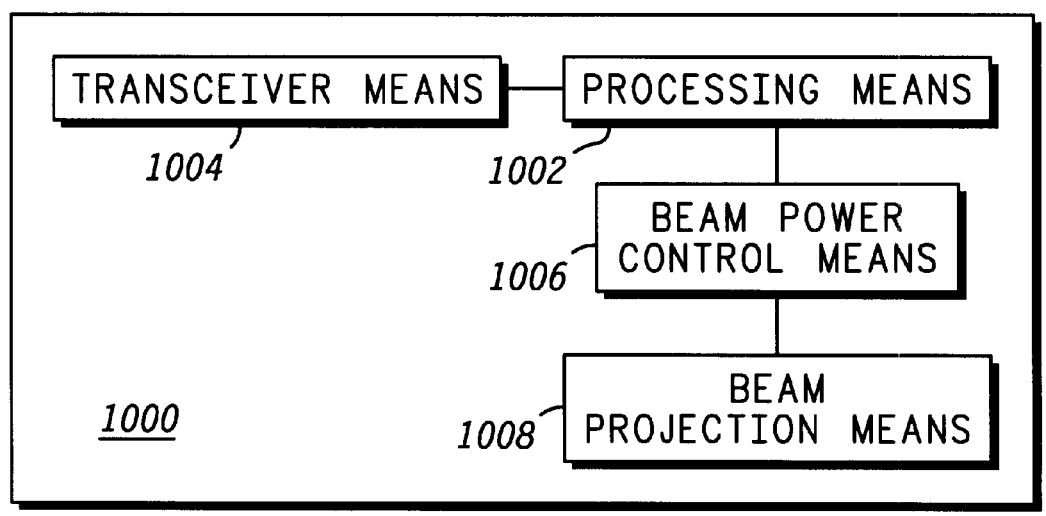

METHOD AND APPARATUS FOR CONTROLLING LINK QUALITY IN A WIRELESS COMMUNICATION SYSTEM

FIELD OF THE INVENTION

The present invention relates generally to wireless communications and, more particularly, to system control based on analyses of cell link margins in a wireless communication system.

BACKGROUND OF THE INVENTION

Wireless communication systems utilize transceiver "nodes" (e.g., cellular base stations or satellites) to transmit information to and receive information from communication units (CUs) (e.g., mobile subscriber units). Typically, a node provides communication channels within one or more regions called "cells". The geographical boundaries defining a cell can be fixed or moving. When a CU is located within the boundaries of a cell which has a sufficient link margin, the CU can exchange messages and information with the node. The link margin is a function of the power level of a signal which a CU receives and is used as a measure of the link quality.

In a communication system where nodes and CUs move with respect to each other, hand offs of a CU from one node to another become necessary in order to provide continuous service to the CU. For example, the user of a mobile CU might travel from one cell to another, making a hand off necessary. Alternatively, the cells provided by the nodes might move across the surface of the earth. Cell movement would occur, for example, in a system which uses non-geosynchronous satellites having satellite-fixed cells (i.e., cells which are fixed relative to the satellite, but move relative to the surface of the earth).

In order to hand off a CU from one cell to another without interruption of the communication link, the physical areas which define a system's cells must be contiguous or must overlap. In prior art systems, a node provides multiple cells which can partially or completely overlap each other. In systems utilizing multiple nodes, each node provides cells which partially or completely overlap with cells from other nodes. When a communication unit is located within an overlapping cell region, multiple cells theoretically are available to the unit and the CU could be handed off to any of the available cells.

In prior art systems, a cellular base station controls hand offs based on signal power measurements received from other base stations which are interspersed throughout the area which the cellular system typically services. The prior-art technique has several drawbacks and is impractical for modern wireless communication systems which service vast geographical areas. One drawback to the prior-art technique is that, in most cases, the base stations which perform the power measurements are not co-located with the CUs. Thus, the power measurements made by the base stations are typically inaccurate compared to the actual signal power at the CU locations. The controlling cellular base station, thus, is forced to control hand offs based on that inaccurate information. Another drawback to the prior-art technique is that the base station measurements typically are infrequently made. Thus, the controlling cellular base station is forced to use power measurements which are not current. This also leads to inaccuracies in controlling hand offs.

The prior-art technique would be impractical for use with a wireless communication system which uses satellites as transceiver nodes. One reason is that the inaccuracies associated with the prior-art technique would be compounded in a non-geosynchronous satellite system. Unlike ground-based systems, satellite movement causes cell link margins across the surface of the service area constantly to be changing. Thus, infrequently made power measurements would significantly affect the accuracy of the base station calculations.

Typically, satellite systems provide communication services to large areas (e.g., the surface of the entire earth). Thus, another reason that the prior-art technique would be impractical for satellite systems is that the expense and difficulty associated with providing dispersed power measurement facilities (e.g., within cellular base stations) in a satellite communication system would be prohibitive.

What is needed is a method and apparatus to enable a communication system accurately to predict link margins within the system. Further needed is a method and apparatus for specific subsystems within the communication system to enhance service in areas which have poor link margins based on link margin predictions.

BRIEF DESCRIPTION OF THE DRAWINGS

FIG. 9 illustrates a block diagram of a control facility in accordance with a preferred embodiment of the present invention; and FIG. 10 illustrates a block diagram of a transceiver node in accordance with a preferred embodiment of the present invention.

DETAILED DESCRIPTION OF THE DRAWINGS

The method and apparatus of the present invention enable a communication system accurately to determine and predict link margins within the system by using communication units (CUs), rather than cellular base stations, to perform power measurements and send those measurements to the control facility. This eliminates the need for costly base stations dispersed throughout the communication system coverage area, which eliminates a significant technological hurdle, especially for a satellite communication system which can provide service in both urban and rural environments. This also increases the accuracy of the power measurements because the measurements are made at the same locations as the CUs, rather than at remote base stations.

Based on these accurate power measurements, the method and apparatus of the present invention enables specific subsystems within the communication system to enhance service in areas which have poor link margins based on link margin predictions. This enhancement of service can be performed by transceiver nodes, which can, for example, adaptively control the transmit carrier power level based on the predictions. Service enhancements can also be performed where the link margin predictions indicate potential faults within the infrastructure of the system, or indicate areas of poor link margin which are temporary (e.g., weather-related anomalies) or permanent (e.g., urban canyons). In such cases, CUs and/or transceiver nodes can be apprised of the condition and controlled or advised to alter transmit power or hand off to a channel having better link margin, for example. The conditions can also be evaluated to improve hand off trajectories for CUs in to minimize dropped calls. Thus, the method and apparatus of the present invention enables a communication system to provide the best quality communication channels for CUs within the system.

A preferred embodiment of the present invention is described in terms of a satellite-based system. It is to be understood, however, that the method and apparatus of the present invention is not intended to be limited to a satellite-based communication system, but also covers terrestrial-based communication systems and combinations of terrestrial and satellite-based communication systems.

Figure 1:
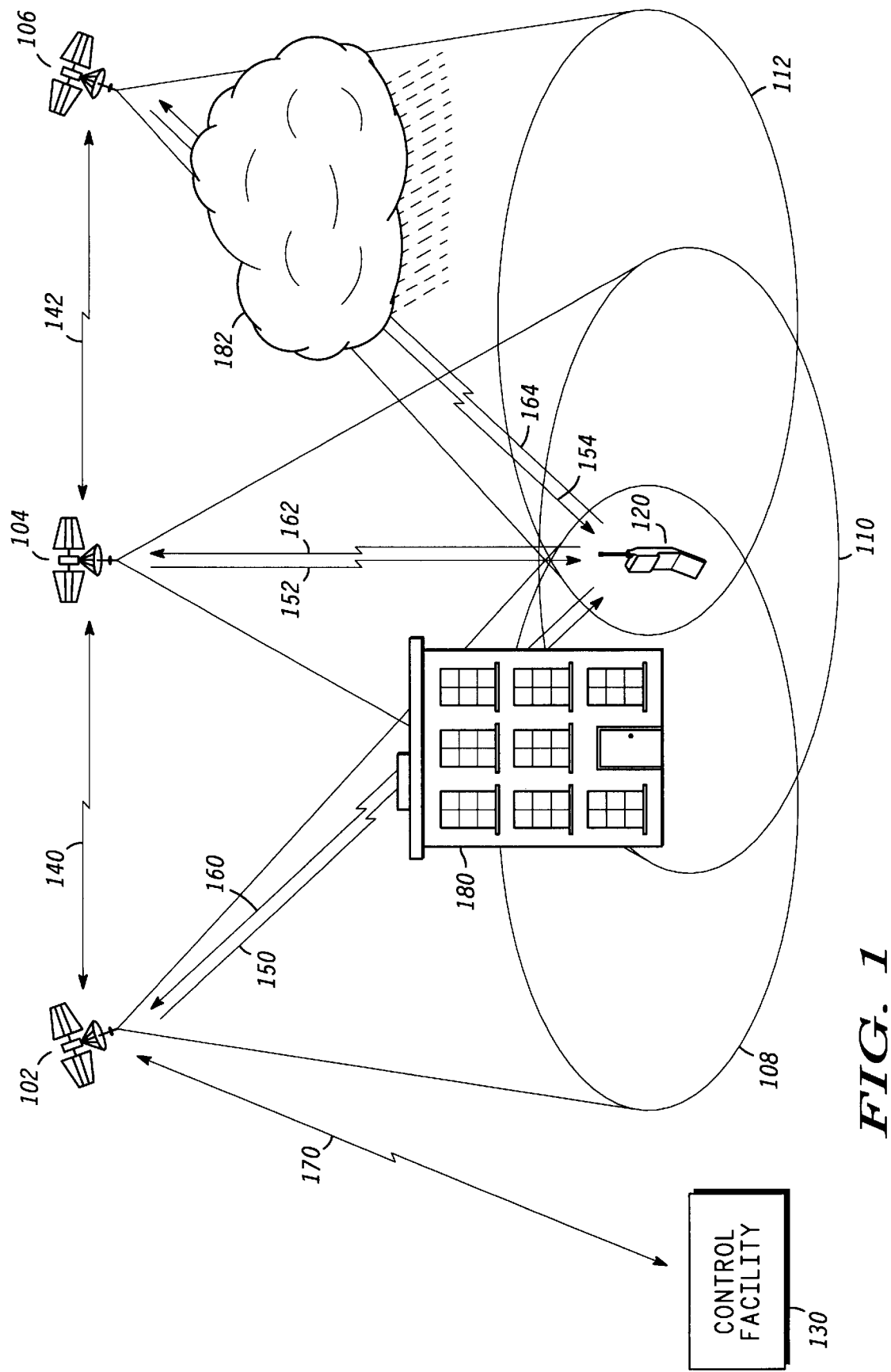
FIG. 1 illustrates a wireless communication system in accordance with a preferred embodiment of the present invention.

FIG. 1 illustrates a wireless communication system in accordance with a preferred embodiment of the present invention. In a preferred embodiment, the communication system includes satellites 102–106, Comunication Unit 120 (CU), and control facility 130. The communication system is shown in conjunction with building 180 and cloud 182, which represent exemplary physical obstructions for signals between satellites 102–106 and CU 120.

CU 120 can be, for example, a mobile cellular telephone or radio adapted to communicate with satellites 102–106 over radio-frequency (RF) links 150–154 and 160–164. CU 120 can be, for example, a vehicle-mounted, portable, or handheld communication unit, or a stationary cellular telephone or radio adapted to communicate with satellites 102–106. In a preferred embodiment, CU 120 is capable of measuring signal power of one or more signals which is received from satellites 102–106 and sending the signal power measurement to control facility 130. In addition, CU 120 is capable of sending its location and a time stamp associated with each measurement to the control facility. The ability of CU 120 to measure and send power measurements to control facility 130 enables the communication system accurately to analyze link margins without the use of dispersed, stationary cellular base stations. In addition, this ability enables CU 120 indirectly to affect power levels of signals, when possible, in order to receive improved service. This provides a significant advantage over the prior art systems. Functionality and an apparatus of a CU in accordance with a preferred embodiment are described in more detail in conjunction with FIGS. 2 and 8.

Satellites 102–106 can be low-earth, medium-earth, or geostationary satellites. In a preferred embodiment, satellites 102–106 are low-earth orbit satellites which communicate with each other over cross-links 140, 142. Thus, in a preferred embodiment, a call from CU 120 which is serviced by a first satellite (e.g., satellite 102) can be routed directly through one or more satellites over cross-links 140, 142 to a second CU (not shown) or terrestrial switching facility (not shown) serviced by a second satellite. In alternate embodiments, satellites could be stand-alone or could route data using bent-pipe links.

Satellites 102–106 route speech and data packets received from CU 120, control facility 130, and other communication devices (not shown). Similar to a beam from a flashlight, for example, a "beam" encompasses channel projections from a satellite toward the surface of the earth. A region on the surface of the earth within which a satellite has sufficient power to transmit and receive information to and from a CU is called a "cell". FIG. 1 illustrates that satellite 102 projects cell 108, satellite 104 projects cell 110, and satellite 106 projects cell 112. Satellites 102–106 could project one or many distinct cells, although each satellite 102–106 is shown to project only a single cell in FIG. 1 for case of illustration.

In a preferred embodiment, satellites 102–106 transmit a "broadcast channel" within each cell 108–112. In a TDMA/FDMA system, each satellite 102–106 transmits the broadcast channel at a distinct timeslot and frequency. In a preferred embodiment, each satellite 102–106 transmits each broadcast channel at the same power level. Because each broadcast channel is at the same power level, in an ideal environment, a receiver (e.g., CU 120) which could measure the received power levels of the broadcast channels for multiple cells would read equal power levels. However, in the real world, the received power levels would differ. It is this difference in received power levels which indicates the strength of signals received in each cell. In alternate embodiments, the satellites 102–106 might not transmit a broadcast channel and/or the power level measurements could be based on reception of some different signal.

CU 120 is shown to be located within an overlapping region of cells 108–112. Therefore, theoretically, CU 120 could communicate with any one of satellites 102–106. Within cells 108–112, satellites transmit information to CU 120 over downlinks 150, 152, 154 and receive information from CU 120 over uplinks 160, 162, 164. A CU's perceived reception power of a signal transmitted by a particular satellite depends on several factors, including the transmission power of the signal, the distance between the satellite and the CU, physical obstructions between the satellite and the CU, and other factors. FIG. 1 exemplifies two physical obstructions which could cause a CU to receive a signal of diminished power. Building 180 obstructs downlink signal 150 from satellite 102 and cloud 182 obstructs downlink signal 154 from satellite 106. Such obstructions reduce the signal power of signals 150, 154 received at CU 120. Because no obstructions exist for signal 152 which is transmitted by satellite 104, the signal power for signal 152 is likely to be higher at the location of CU 120 than the signal power for signals 150 and 154. From a signal power perspective, satellite 104 would be the desired satellite which CU 120 should use to communicate within the system. In a preferred embodiment, satellites 102–106 are capable of controlling their transmission power to compensate for link margins which are too high or too low.

Satellites 102–106 also communicate with control facilities (e.g., control facility 130) over links (e.g., link 170) between the satellites 102–106 and the control facilities. An apparatus associated with a satellite in accordance with a preferred embodiment is described in more detail in conjunction with FIG. 10.

In a terrestrial communication system, satellites 102–106 are not employed. Instead, a terrestrial base station provides the RF interface between a CU and a control facility. In such a system, the terrestrial base station can be co-located with a control facility, or can be coupled to the control facility over a hard-wired, RF, or optical link. The method and apparatus can be applied to a satellite communication system, a terrestrial communication system, or a combination thereof.

Control facility 130 is a device, typically ground based, which receives data from other components of the system (e.g., satellites 102–106 and/or CU 120), analyzes the data, and provides system control based on the analysis. Control facility 130 can be co-located with a switching gateway (not shown) or other device, for example, or can be a stand-alone facility. In a preferred embodiment, control facility 130 receives signal power measurements from CUs and uses those measurements, along with CU location information and measurement time stamps, to affect power levels of signals provided within the system. Functionality and an apparatus of a control facility in accordance with a preferred embodiment are described in more detail in conjunction with FIGS. 4–6 and 9.

FIG. 1 illustrates only a few satellites 102–106 and a single CU 120 and control facility 130 for ease of illustration. However, any number of CUs 120, satellites 102–106, and control facilities 130 can be used in a communication system.

Figure 2:
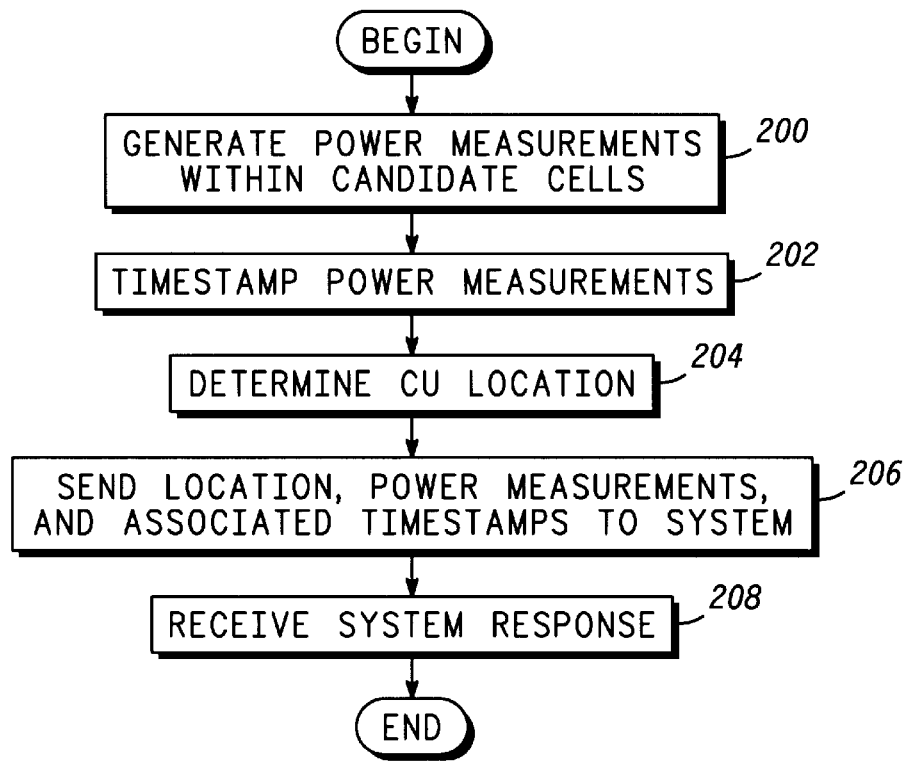
FIG. 2 illustrates a flowchart of a method for a communication unit (CU) to report signal power measurements and respond to system commands in accordance with a preferred embodiment of the present invention.

FIG. 2 illustrates a flowchart of a method for a CU to report one or more signal power measurements and to respond to system commands in accordance with a preferred embodiment of the present invention. The method begins when the CU generates one or more power level measurements, in step 200, of one or more signals received from a transceiver node. In a preferred embodiment, the measurements are for cell broadcast signals within one or more "candidate cells". In an alternate embodiment, the CU sends power measurements only for the cell it is currently using to communicate.

Typically, a candidate cell is a cell within whose area a CU is located. Because the CU is located within the candidate cell area, the channels provided within the cell are theoretically accessible to the CU. As exemplified in FIG. 1, CU 120 is located within three candidate cells 108, 110, 112 provided by three transceiver nodes 102, 104, 106. In a preferred embodiment, the CU has knowledge of candidate cells from a "candidate cell list" which is stored within the CU. Desirably, the candidate cell list is determined by a control facility and sent to the CU. In alternate embodiments, the candidate cell list can be determined by a different device (e.g., the CU or a transceiver node). Determination of a candidate cell list is described in detail in conjunction with FIG. 7.

In a preferred embodiment, the candidate cell list identifies the parameters defining a broadcast channel within each cell. For example, in a system which employed Time Division Multiple Access (TDMA) and/or Frequency Division Multiple Access (FDMA) communication prtocols, the parameters defining a channel would be timeslot and/or frequency of the broadcast channel. Thus, to measure the power of the channel, the CU would identify, from the candidate cell list, the timeslot and frequency of the channel and would measure the power level of a signal received by the CU at the identified timeslot and/or frequency. In that manner, the CU could measure the power levels of each channel identified in the candidate cell list.

In a preferred embodiment, the candidate cell list includes broadcast channels for cells which the control facility previously determined to have the best power levels available to the CU. The determination of which cells are best is made from historic power level measurements of the broadcast channels previously sent to the control facility from one or more CUs.

In alternate embodiments, the candidate cell list could be determined by a device different from the control facility (e.g., a satellite or CU). In other alternate embodiments, the channels identified within the list could be channels different from the broadcast channel and each channel could be identified in some way other than by its defining parameters. For example, a CU could have knowledge of the parameters associated with a broadcast channel for each cell and the candidate cell list could simply contain a cell identification number for the candidate cells. How a CU has knowledge of which signals from which candidate cells to measure is not crucial to the present invention.

In a preferred embodiment, the CU also performs the step 202 of "time stamping" each power measurement by determining a time at which each measurement is taken and associating the time with the measurement. The time stamp is simply the time at which the CU made the power measurement. As will be described later, the time stamp enables the control facility to accurately update its link margin information. How the CU determines the time of each measurement is not critical to the present invention. In alternate embodiments, no time stamp is associated with the power measurement, or the time stamp is associated with a power measurement by either the control facility or a transceiver node which relays the measurement.

In a preferred embodiment, the CU determines its location in step 204. Location determination could be performed in any of several different ways including, for example, triangulation, global positioning system (GPS), or Doppler measurements between the CU and one or more transceiver nodes. A coarse location approximation could be made by identifying the cell within which the CU is communicating. Alternatively, the CU could receive its location from another device or from inputs by the CU user. The CU determines its location so that the control facility can associate each power level measurement with the location. How the CU determines its location is not critical to the present invention. In alternate embodiments, no location is associated with a power measurement, or the location is associated with a power measurement by either the control facility or a transceiver node which relays the measurement.

In alternate embodiments, the CU could perform steps 200–204 in different orders, or could dispense with either of steps 202 and 204 all together. Steps 202 and 204 are desirable, however, because they enhance the ability of the control facility to evaluate the power measurements received from CUs.

In step 206, the CU sends the one or more power measurements, along with the CU location and time stamp, if any, to the communication system. The power measurements are sent in a "power measurement message" to the system. In a preferred embodiment, the CU sends the information either directly or indirectly to a control facility which uses the information to determine whether the control facility should cause the CU to communicate using a different power level (e.g., by increasing the power level of the current channel or by causing the CU to be handed off). When the control facility receives power level measurements from other CUs dispersed throughout the area serviced by the system, the control facility also can use these additional power level measurements to monitor the state of power levels within the communication system. Sending the information directly would require a direct RF, hardwired, or optical link between the CU and the control facility. For indirect communication, the CU could sent the information through a satellite or other transceiver node to the control facility, for example.

Figure 3:
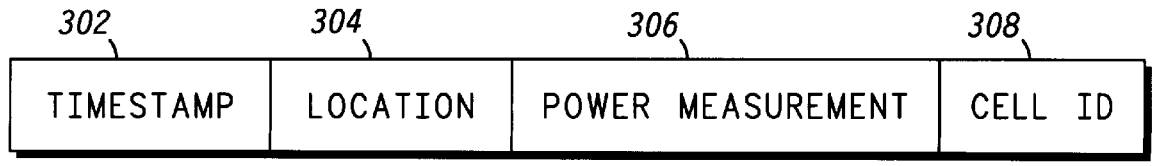
FIG. 3 illustrates an exemplary CU power measurement message in accordance with a preferred embodiment of the present invention.

FIG. 3 illustrates exemplary CU power measurement message 300 in accordance with a preferred embodiment of the present invention. Message 300 includes time stamp 302, location 304, power measurement 306, and cell ID 308. Cell ID 308 indicates which cell the power measurement 306 is associated with. Although message 300 indicates that a single power measurement, CU location, and time stamp are be sent in a single message, multiple power measurements, CU locations, and time stamps for multiple cell IDs 308 could be sent in a single message. Alternatively, multiple messages could be used for each field 302–308 of message 300. In alternate embodiments, where either time stamp 302 and/or location 304 are not sent by the CU, either or both fields 302–304 would not exist. How message 300 is structured and how the information is sent to the communication system is not important. What is important is that the CU performs its own power measurements for candidate cells and sends that information to the communication system.

In a preferred embodiment, the CU sends a power measurement message to the control facility after the CU has determined that it wants to hand off. For example, the CU might measure the power level of the channel on which it is communicating (or, alternatively, the broadcast channel in the cell in which the CU is communicating) and compare that power level with a threshold value. When the power level falls below the threshold, the CU could determine that it wants to hand off to a different channel. The CU would then send a request to the system indicating that it wants to hand off to another channel. The power level measurement message would be sent to the control facility as part of, or concurrent with, that hand off request.

In another preferred embodiment, the CU sends a power measurement message to the control facility after receiving a request for one or more power measurements from the control facility. Upon receipt of such a request, the CU could send the one or more power measurements and, in a preferred embodiment, the CU location and time stamp. Thus, performance of steps 200–206 can be initiated by the CU on its own (e.g., when it detects a need to hand off) or by the control facility.

Performance of steps 200–206 could occur occasionally regardless of whether the CU detects a need to hand off or receives a request from the control facility for a power level measurement. For example, a CU could periodically measure the power levels of candidate cells and store those power level measurements for a duration of time until they are to be sent to the control facility. Aperiodic measurements also could occur, for example, each time the CU is powered up or each time the CU makes a call attempt or receives a ring alert. Preferably, steps 200–206 are repeated by the CU occasionally so that the control facility can maintain current information about the link margins experienced by the CU.

Referring back to FIG. 2, some time after the power measurement message is sent to the system, the CU receives a system response to the message in step 208. The system response is based on at least the information contained within the power measurement message 300. The system response could include any of several different types of instructions or data. For example, where the power measurements indicate that the CU is experiencing an unacceptable link margin, but the system is unable to mitigate the effects of the link margin, the system response could be a message to the CU that only degraded service can be provided to the CU at the current location. Such a message could then be passed onto the CU user via a display. Where the system is able to mitigate the effects of the link margin by handing off the CU to another channel, the system response could be a message instructing the CU to hand off to a different channel (i.e., a channel in a cell whose broadcast channel had the most acceptable power level). The different channel could be provided within a different cell of the same transceiver node, for example, or within a cell provided by another transceiver node.

In the event that the CU does receive a system response and the response indicates that the CU should hand off to a different channel, the CU hands off according to the system response. Step 208 might not always occur. In other words, a system response need not always be received by the CU. For example, where the power measurements indicate that the CU is being provided with adequate service, a system response is not necessary (although a response indicating that all is well could optionally be sent). A response also would not be necessary when the control facility determines that it can mitigate the effects of the inadequate link margin by controlling the power level of a transceiver node. For example, where the control facility determines that, based on the power measurements, the link margin for a particular CU is too low, the control facility might be able to raise the link margin by instructing the transceiver node which is providing a channel to the CU to raise its transmission power level. After step 208, if it occurs, the procedure ends.

Figure 4:
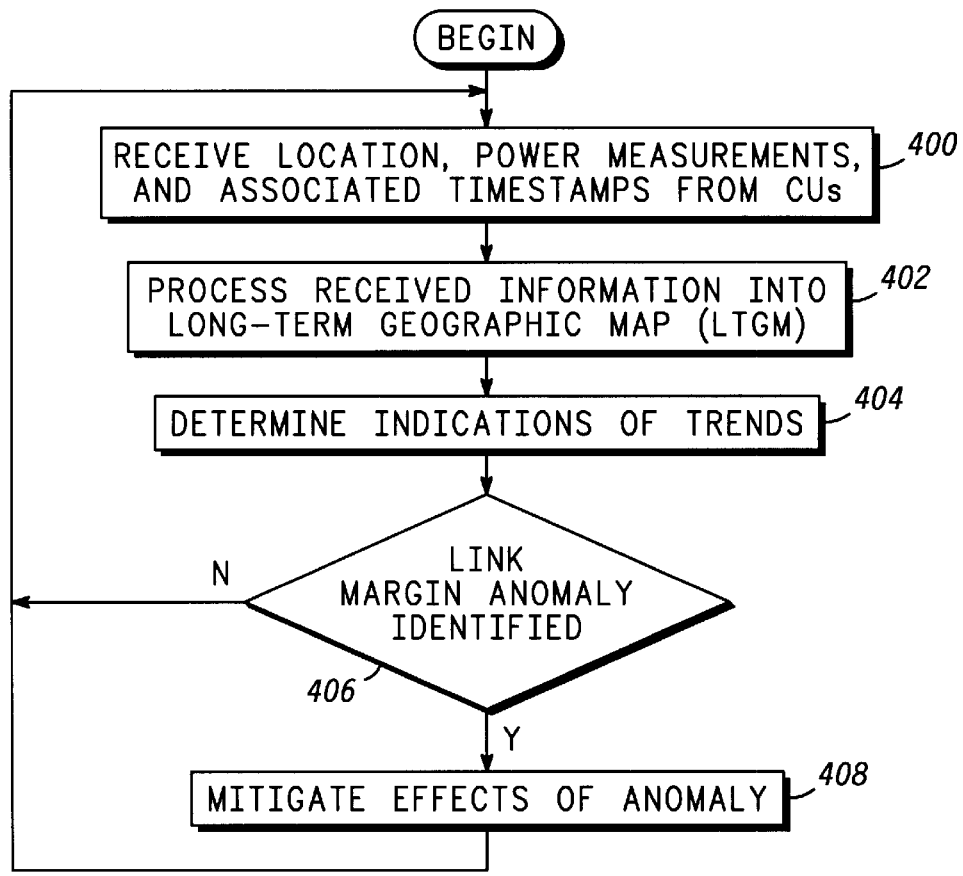
FIG. 4 illustrates a flowchart of a method for a control facility to predict future link margin anomalies in accordance with a preferred embodiment of the present invention.

FIG. 4 illustrates a flowchart of a method for a control facility to predict future link margin anomalies in accordance with a preferred embodiment of the present invention. The method begins, in step 400, when the control facility receives power measurements and location information from one or more CUs dispersed throughout the area serviced by the communication system. Desirably, for each CU, the control facility receives power measurements for each cell in the CU's list of candidate cells. As discussed previously, a CU could send a power measurement message for several different reasons, such as sending the message with a hand off request, as a result of a prompt from the control facility, periodically, and/or aperiodically based on some event (e.g., CU power up). In a preferred embodiment, time stamp data are associated with the received power measurements and location information.

The control facility processes the received power measurements in step 402 to create a Long Term Geographic Map (LTGM) of the link margins within the area serviced by the communication system. The LTGM is created by associating the CU location data with each power measurement and, thus, creating a geographic map of power levels over a particular geographic area. The LTGM is used to accumulate power measurement data desirably over a long period of time. The accumulation of data enables identification of regions where coverage is degraded, for example, because of local shadowing (e.g., buildings, mountains, or heavy forest). The information can be used in real-time or in future system design iterations to help mitigate trouble areas.

The LTGM is updated occasionally. Where time stamp data is associated with the power level measurements, measurements for a particular location which were made later than the measurements upon which the LTGM is based are used to update the power measurements which are incorporated into the LTGM. A time stamp also enables the system to know how current information is and also the longevity of a particular link margin condition.

From the LTGM, the communication system is able to determine indications of link margin trends in step 404. For example, the LTGM might indicate that every CU within a particular area is experiencing increasingly degraded service which might soon reach unacceptable levels. The LTGM also might indicate an area of permanent degradation.

A determination is made, in step 406, whether a link margin anomaly has been identified based on the link margin trends. A link margin anomaly (or power level anomaly) indicates that a transceiver node is not currently or soon will not be providing communication channels at power levels that will enable acceptable service to exist between a CU and the transceiver node. Evaluation of the power level trends from the LTGM, thus, enables the system to predict areas where unacceptable service will exist. The control facility can determine that a power level is unacceptable, for example, by comparing a power measurement (or an entry in the LTGM near the CU's location) with an upper and lower acceptance threshold. If the power measurement is below the lower acceptance threshold, the control facility would determine the power level to be unacceptable. Similarly, when the power measurement is above an upper acceptance threshold, the control facility also would determine the power level to be unacceptable. If no link margin anomaly has been identified, the procedure iterates as shown in FIG. 4.

If a link margin anomaly has been identified (i.e., an area with unacceptable service is predicted), then the system proceeds to mitigate the effects of the anomaly, if possible, in step 408. Desirably, the link margin anomaly can be mitigated before unacceptable service occurs. One way the system might attempt to mitigate the effects of the anomaly is to control the power levels of communication channels provided to the CUs. This is accomplished by the control facility sending at least one message to a device (e.g., a transceiver node or a CU) which can affect the power level. For example, where a power level is unacceptable, the control facility can instruct a transceiver node to adjust its transmission power. Where a link margin is becoming too low, the message could instruct the transceiver node to adjust the transmission power to a higher level. Where a link margin is becoming too high, the message could instruct the transceiver node to adjust the transmission power to a lower level.

Alternatively, the system might attempt to mitigate the effects of the anomaly by determining another communication channel which the CU could use which has an acceptable power level. The system would then send a message to the CU to hand off to that next communication channel. To whether another communication channel has an acceptable power level, the control facility would process the received power level measurements (e.g., using the LTGM) to determine whether the next communication channel is being transmitted at a power level which is sufficient to provide acceptable communication service to the CU in the area in which the CU is located.

Figure 7:
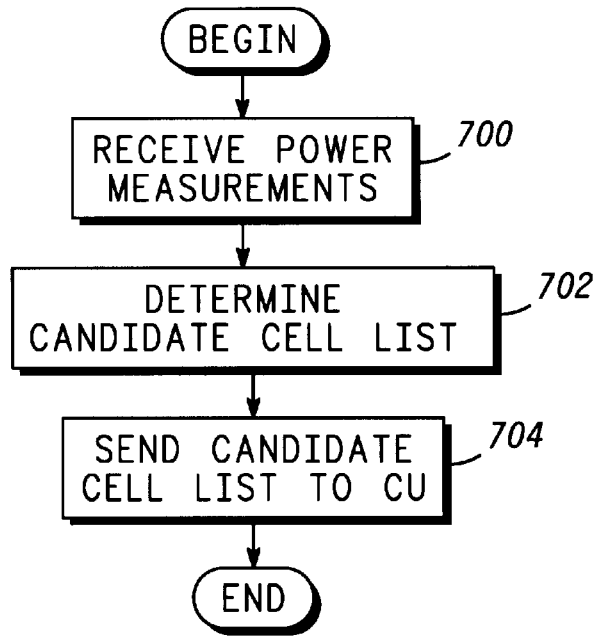
FIG. 7 illustrates a flowchart of a method for creating lists of candidate cells in accordance with a preferred embodiment of the present invention.

In a preferred embodiment, as described in conjunction with FIG. 7, the control facility also uses the received power measurements during generation of lists of candidate cells which are then sent to one or more CUs. After mitigating the effects of the anomaly, the procedure then ends.

Figure 5:
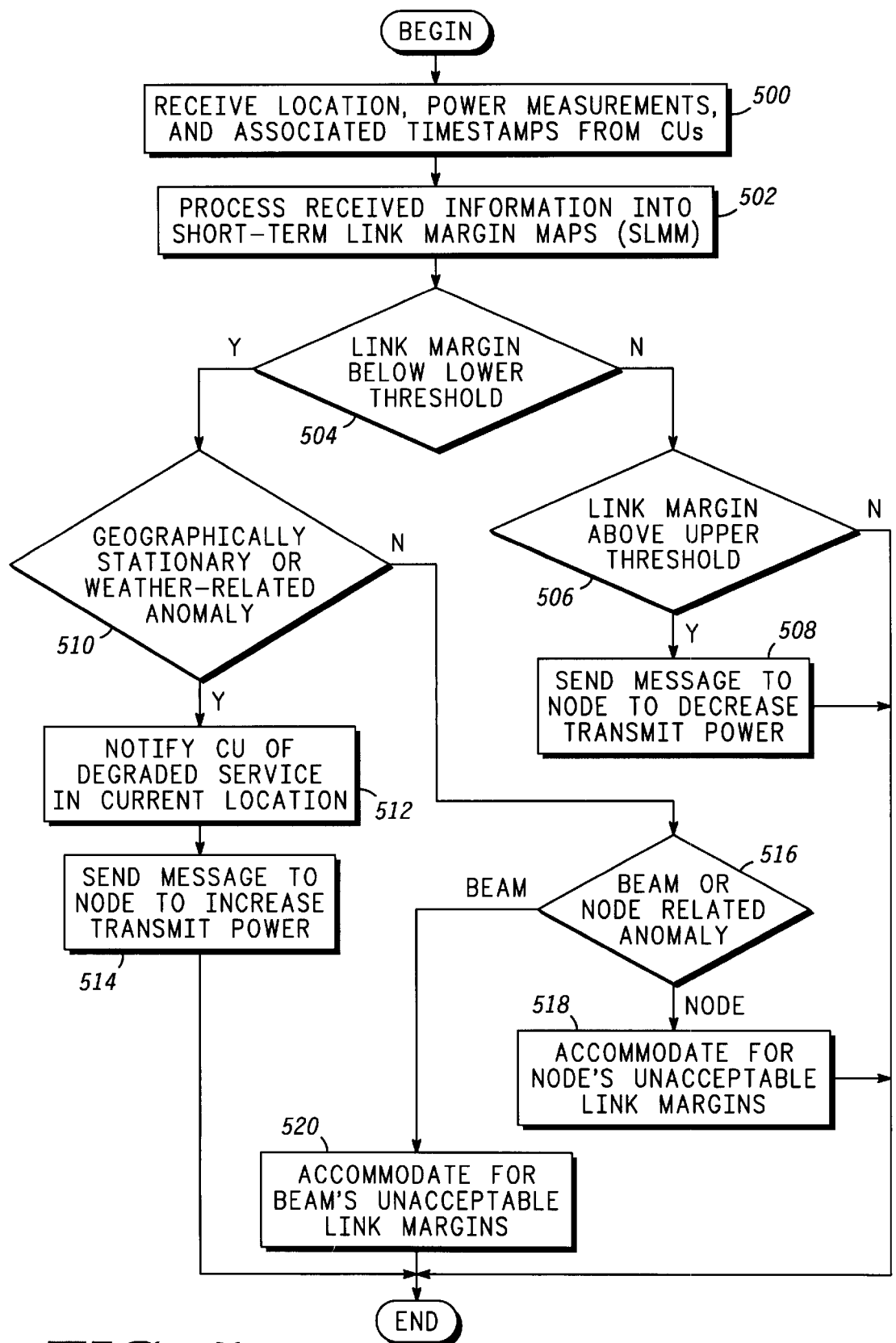
FIG. 5 illustrates a flowchart of a method for a control facility to identify and mitigate current link margin anomalies in accordance with a preferred embodiment of the present invention.

FIG. 5 illustrates a flowchart of a method for a control facility to identify and mitigate current link margin anomalies in accordance with a preferred embodiment of the present invention. The method begins, in step 500, when the control facility receives power measurements and location information from one or more CUs dispersed throughout the area serviced by the communication system.

The control facility processes the received power measurements in step 502 to create a Short Term Link Margin Map (SLMM) of the link margins within the area serviced by the communication system. The SLMM is similar to the LTGM described in conjunction with FIG. 4. The difference between the SLMM and the LTGM is that the SLMM is used to show an average of link margin (or power measurement) data over a shorter time period. Thus, the SLMM is used to rapidly detect link margin anomalies which occur, rather than to detect longer-term (e.g., permanent) link margin anomalies.

The SLMM is created by associating the location data received with each power measurement and, thus, creating a geographic map of power levels over a particular geographic area. Where time stamp data is associated with the power level measurements, measurements for a particular location which were made later than the measurements upon which the SLMM is based are used to update the power measurements which are incorporated into the SLMM. A time stamp also can be used to determine the longevity of a particular link margin anomaly.

In a preferred embodiment, other types of link margin maps can be created which aid in the evaluation of link margins within the system. For example, a transceiver node map could determine link margins for calls being supported by a particular node. This data could be compared to nominal data to determine if, for example, the average link margin from signals provided by a particular transceiver node is above or below acceptable limits. If either of these conditions are true, and the condition persists, then corrective action could be taken.

A beam map also could be generated, for example, which isolates power measurements for individual tansmitting elements of a transceiver node (i.e., where the transceiver node projects multiple beams). This information could be used to determine whether a link margin anomaly could be mitigated by altering the use of a particular transmitting element or whether the entire transceiver node is the cause of the anomaly.

In step 504, the control facility determines, based on the SLMM, whether a link margin in a particular area falls below a lower acceptance threshold by comparing a power measurement (or an entry in the SLMM near the CU's location) with the lower acceptance threshold. If the link margin does not fall below the lower acceptance thesheld, the control facility determines, in step 506, whether the link margin is above an upper acceptance threshold by comparing a power measurement with the upper acceptance threshold. If not, the link margin is acceptable and the procedure ends. If so, the control facility sends, in step 508, a message to the one or more transceiver nodes which are providing channels to the area to decrease the transmission power within at least one beam.

Referring back to step 504, if the control facility determines that a link margin falls below the lower threshold, the control facility attempts to determine whether the link margin anomaly indicates a geographically stationary (e.g., an urban canyon or mountain range) or a weather-related anomaly. This determination can be made based on the longevity of the degraded service. If the degraded service has existed for a substantial period of time (e.g., as indicted by a LTGM), then the control facility would determine that the link margin anomaly is geographically stationary or weather-related.

When the control facility determines that the link margin anomaly is geographically stationary or weather related, then the control facility can perform either or both of steps 512 and/or 514. First, the control facility can notify the CU of degraded service in the CU's current location in step 512. The CU could display this information to the CU user who could then change the location of the CU to an area which affords better service. The control facility also can send a message to one or more transceiver nodes which are providing channels to the area to increase their transmission power in step 514. Performing either one of these steps might eliminate the need to perform the other. The procedure then ends.

Referring back to step 510, if the control facility does not determine that the link margin anomaly is geogaphically stationary or weather-related, the control facility determines, in step 516, whether the link margin anomaly is due to a condition (e.g., a fault condition) experienced by a transceiver node or specifically, if the anomaly is due to a particular beam of a transceiver node. This determination can be made in a preferred embodiment, by analyzing a transceiver node map or a beam map as discussed above. In an alternate embodiment, the control facility can make the determination of whether the anomaly is transceiver node related by evaluating whether the area associated with the anomaly is stationary or moving. A moving area of degraded service indicates that a transceiver node which is providing service to the area is likely the cause of the anomaly (e.g., the transceiver node is experiencing some technical problem). Diagnostic information received from the transceiver node also could be used to determine whether the transceiver node is a cause of the anomaly. The control facility could determine whether the anomaly is specifically related to a particular beam provided by a transceiver node by evaluating the size and position of the anomaly with respect to the transceiver node.

When the control facility determines that the anomaly is transceiver node related, the control facility attempts to accommodate for the node's unacceptable link margins in step 518. As described in conjunction with FIG. 4, one way the system might attempt to mitigate the effects of the anomaly is to control the power levels of communication channels which a transceiver node provides to the CUs by sending at least one message to the transceiver node to adjust the transmission power to a higher level. Alternatively, the system might determine another communication channel (e.g., a channel provided by another transceiver node) to which the CU could be handed off which has an acceptable power level, and instruct the transceiver node to support a hand off to that channel. After the control facility has accommodated for the transceiver node related anomaly, the procedure ends.

When the control facility determines that the anomaly is beam related, the control facility attempts to accommodate for the beam's unacceptable link margins in step 520. A beam-related anomaly would indicate that a particular transmitting element of a transceiver node is not transmitting signals of the appropriate power. If the transmission power can be adjusted to acceptable levels, the control facility would send at least one message to the transceiver node to modify the transmission power of the transmitting element. If the transmission power cannot be adjusted, the system might support a hand off of those CUs which are being supported by the particular transmitting element. After the control facility has accommodated for the beam-related anomaly, the procedure ends.

Figure 6:
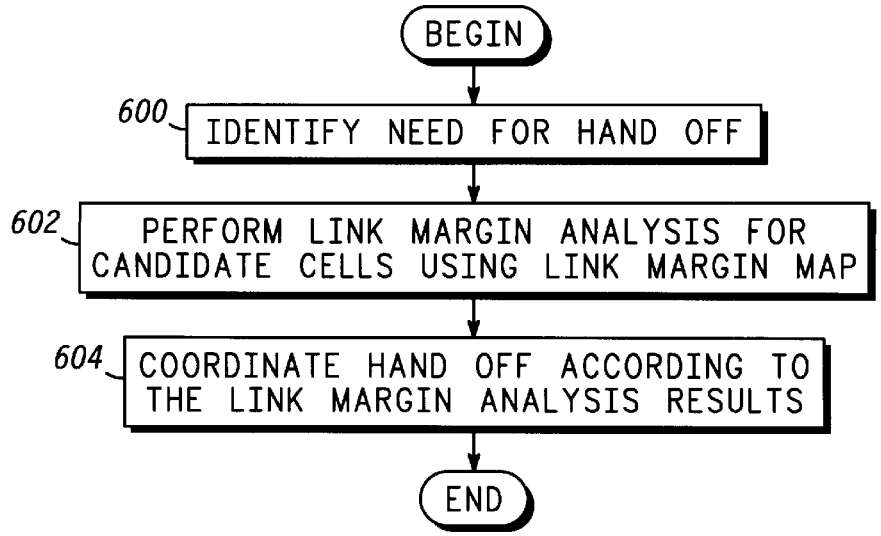
FIG. 6 illustrates a flowchart of a method for handing off a CU based on CU-reported power measurements in accordance with a preferred embodiment of the present invention.

FIG. 6 illustrates a flowchart of a method for handing off a CU based on CU-reported power measurements in accordance with a preferred embodiment of the present invention. The method begins when a need for a hand off is identified in step 600. The need for a hand off could be identified in several ways. For example, the need for a hand off could be identified when the control facility receives a message from the CU which includes a request to hand off from the channel the CU is currently using to communicate with a transceiver node. Alternatively, the control facility could identify the need for a hand off by evaluating previously received power measurements from CUs near the area where the CU is located. The control facility could then determine whether the previously received power measurements indicate that acceptable communication service exists between the CU and the transceiver node which is providing the channel to the CU. When the power measurements indicate that the communication service is unacceptable, the control facility would identify the need for a hand off.

When a hand off is needed, the control facility performs a link margin analysis for candidate cells using a link margin map (either long or short term) in step 602. Analyzing the link margins involves processing power measurements received from CUs to determine at least one other channel to which the CU could hand off. As described previously, one method of processing the power measurements involves developing a geographic map of power levels over a geographic area which includes the location of the CU. The power level map could then be used to determine whether a power level of another channel would enable a transceiver node to provide acceptable communication services to the CU.

In step 604, the control facility then coordinates a hand off based on the link margin analysis results. Coordination of hand off, in a preferred embodiment, would entail sending hand off messages to the transceiver node from which the CU is handing off, the transceiver node to which the CU is handing off, and/or the CU which is being handed off. The format of the messages and the particular devices (e.g., transceiver node and/or CU) to which the hand off messages are sent is not crucial to the present invention. After coordinating hand off, the procedure ends.

In an alternate embodiment, the determination of the channel to which a CU should hand off could be performed instead by the CU based on the candidate cell list stored within the CU. The candidate cell list, which is based on power measurements performed by CUs, would be created by the control facility and occasionally sent to each CU. The CU could hand off to a channel within any cell on the candidate cell list For example, the CU could measure the current power for each cell on the list and hand off to the cell with the highest power. The CU also could measure signal power levels to determine those cells on the list which have acceptable power levels and hand off based on other criteria such as, for example, the amount of time the cell will be within range of the CU.

FIG. 7 illustrates a flowchart of a method for creating lists of candidate cells in accordance with a preferred embodiment of the present invention. As described previously, a CU measures received power for cells listed in a candidate cell list which the CU previously received from a control facility. In a preferred embodiment, the control facility generates the candidate cell lists for each CU based on power measurements received from at least one CU. In a communication system where beams rapidly move with respect to the CUs (e.g., in a satellite system), candidate cell lists for each CU are continually updated based on the movement of the beams.

Creation of a candidate cell list begins in step 700 when the control facility receives power measurements from at least one CU which is located near the vicinity of the CU for whom the list is being generated. From the power measurements, the control facility determines, in step 702, cells which provide service at the CU location which have channels with acceptable link margins. This determination can be made, for example, from an LTGM or SLMM in a preferred embodiment. In alternate embodiments, the determination can be made without the use of a geographic map, or by using a different type of map (e.g., a transceiver node map or a beam map). The control facility can include all cells which provide acceptable service at the location within the candidate cell list, or the control facility can exclude particular cells based on various criteria. For example, the control facility might exclude a cell which will soon move out of range of the CU. The control facility might also exclude a cell which is already at or near communication channel capacity.

In step 704, the control facility sends the candidate cell list to one or more CUs for which the list was created. The list can be sent over a direct or indirect RF communication link, for example, or over a hard-wired link. The list can be sent in one or more dedicated messages or can be multiplexed with other control or data messages. How the candidate cell list is sent to the CU is not crucial to the invention. Once the candidate cell list is received by a CU, the list can be used as described above. The procedure then ends.

Figure 8:
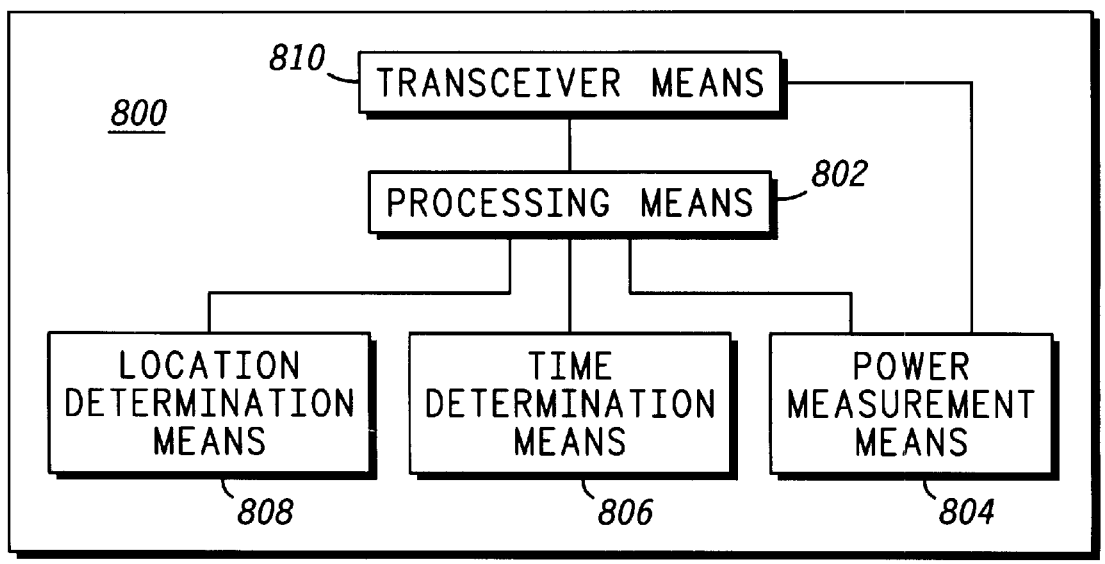
FIG. 8 illustrates a block diagram of a CU in accordance with a preferred embodiment of the present invention.

FIG. 8 illustrates a block diagram of CU 800 in accordance with a preferred embodiment of the present invention. CU 800 comprises processing means 802 coupled to power measurement means 804 and transceiver means 810. Transceiver means 810 comprises a receiving means and a transmitting means (not shown). In a preferred embodiment, CU 800 also includes location determination means 808 and time determination means 806, although they are not necessary to achieve many of the advantages of the present invention.

Processing means 802 controls power measurement means 804 which performs power measurements for one or more channels (e.g., broadcast channels for cells identified in a candidate cell list). In a preferred embodiment, processing means 802 also controls location determination means 808 which determines the current location of CU 800 and controls time determination means 806 which determines a time at which each power measurement was taken. Processing means 802 receives the power measurements, location, and time stamp and creates one or more messages which includes the information. The information is then transmitted, via transceiver means 810, to a control facility for analysis. In alternate embodiments, processing means 802 can store the information and/or the message(s) which include the information in a memory device (not shown) for a duration of time. Processing means 802 can then transmit the information to the control facility at a later time.

In a preferred embodiment, processing means 802 also receives, via transceiver means 810, messages which enable CU 800 to affect the received power level, if possible, when CU 800 is communicating using signals with an unacceptable link margin. One message could be, for example, a message to hand off to a channel having an acceptable link margin. Where no better channel is available, the message could inform CU 800 that the user cannot receive better service at the current location. CU 800 could display such a message to the user. The functions performed by CU 800 in preferred and alternate embodiments of the present invention are described in detail in conjunction with FIGS. 2–3. CU 800 could perform other functions as well.

FIG. 9 illustrates a block diagram of control facility 900 in accordance with a preferred embodiment of the present invention. Control facility 900 comprises processing means 902 and transceiver means 904. Transceiver means 904 comprises a receiving means and a transmitting means (not shown). In a preferred embodiment, control facility 900 also comprises link margin map determination means 906 and data storage means 908.

Processing means 902 receives power measurements via transceiver means 904 from at least one CU. The power measurements can be received as part of another message (e.g., a hand off request message) or as a separate message. In addition, multiple power measurements can be received in the same message or each power measurement can be received separately. As described previously, processing means 902 uses the power measurements to evaluate link margins within the system and to accommodate, where possible, for unacceptable link margins. In a preferred embodiment, the evaluation of the received link margins entails the analysis of a long term or short term link margin map. As described previously, the link margin map can be geographical, transceiver node based, or beam based.

In a preferred embodiment, link margin map determination means 906 generates and updates one or more link margin maps which are used for analysis. In an alternate embodiment, processing means 902 could generate and/or update the maps. The link margin maps are stored in data storage means 908. Link margin map determination means 906 uses the received power measurements and, when available, the location and time stamp information to create the link margin maps. In a preferred embodiment, the location and time stamp information are sent by the CU along with each power measurement. In alternate embodiments, the location and time stamp information can be derived elsewhere. For example, in an alternate embodiment, link margin map determination means 906 could have access to a database (e.g., in data storage means 908) which contains current information on the location of each CU. The stored location information could be used rather than location information sent by the CU. In another alternate embodiment, time stamp information could be applied to each power measurement by control facility 900 or a transceiver node when the measurement is received. The functions performed by control facility 900 for preferred and alternate embodiments of the present invention are described in detail in conjunction with FIGS. 4–7. Control facility 900 can perform other functions as well.

FIG. 10 illustrates a block diagram of transceiver node 1000 in accordance with a preferred embodiment of the present invention. Transceiver node 1000 could be, for example, a satellite or a terrestrial base station. In a preferred embodiment, transceiver node 1000 comprises processing means 1002, transceiver means 1004, beam power control means 1006, and beam projection means 1008. Transceiver means 1004 comprises a receiving means and a transmitting means (not shown). Although only one beam power control means 1006 and beam projection means 1008 are shown for ease of illustration, transceiver node 1000 could contain multiple beam power control means 1006 and beam projection means 1008, depending on how many beams transceiver node 1000 projects.

In a preferred embodiment, processing means 1002 receives and processes messages from a control facility via transceiver means 1004. The control facility messages are based on analyses performed by the control facility of power measurements received from CUs. One type of message could inform beam power control means 1006 to cause beam projection means 1008 to increase or reduce the transmission power of its signals. Another type of message could inform processing means 1002 to support a hand off of one or more CUs to another channel. The hand off could be to another channel provided by the same transceiver node 1000 or could be to a channel provided by another transceiver node.

The functions performed by transceiver node 1000 in accordance with preferred and alternate embodiments of the present invention are described in detail in conjunction with FIGS. 4–7. Other functions also could be performed by transceiver node 1000. For example, transceiver node 1000 could be used to relay messages between CUs and control facilities. These messages could be relayed either directly or via other transceiver nodes.

The present invention has been described above with reference to preferred embodiments. However, those skilled in the art will recognize that changes and modifications may be made in these preferred embodiments without departing from the scope of the present invention. For example, the processes and apparatus stages identified herein may be categorized and organized differently than described herein while achieving equivalent results. These and other changes and modifications which are obvious to those skilled in the art are intended to be included within the scope of the present invention.

What is claimed is:

1. In a wireless communication system comprising a control facility and at least one transceiver node which interfaces between a communication unit (CU) and the wireless communication system, a method for the CU to affect power levels of channels which the CU uses to communicate with the wireless communication system, wherein the channels are provided by the at least one transceiver node, the method performed by the CU comprising the steps of:
    a) generating a first power level measurement of a first power level of a first channel which is provided by a first node of the at least one transceiver node; and
    b) sending the first power level measurement and a geographic location of the CU to the control facility;
    c) occasionally repeating the steps of generating the first power level measurement and sending the first power level measurement to the control facility;
    d) the control facility developing a geographic map which provides an indication of power measured by the CU as a function of the geographic location of the CU; and
    e) the control facility using the geographic map to affect power levels of channels which the CU uses to communicate with the wireless communication system.

2. The method as claimed in claim 1, further comprising the steps of:
    f) receiving an instruction from the control facility to hand off communications from the first channel to a second channel after the control facility determines that the CU should communicate at the second power level by using the second channel.

3. The method as claimed in claim 1, further comprising the steps of:
    b1) determining, prior to the step of sending the first power level measurement to the control facility, that the CU wants to hand off communications to another channel; and b2) sending a request to hand off the communications concurrently with sending the first power level measurement to the control facility.

4. The method as claimed in claim 3, wherein the step of determining that the CU wants to hand off the communications comprises the steps of:
    b11) comparing the first power level measurement to a first threshold; and
    b12) when the first power level measurement falls below the first threshold, determining that the CU wants to hand off the communications.

5. The method as claimed in claim 1, further comprising the steps of:
    a1) receiving a request from the control facility for the first power level measurement; and
    a2) sending the first power level measurement to the control facility as a result of receiving the request.

6. The method as claimed in claim 1, further comprising the steps of:
    c1 generating at least one additional power level measurement of at least one other channel, wherein the at least one other channel is identified in a list of candidate channels to which the CU has access; and
    c2 sending the at least one additional power level measurement to the control facility so that the control facility can determine whether the control facility should cause the CU to communicate using a second channel having the second power level.

7. The method as claimed in claim 6, wherein the step of generating the first power level measurement comprises the steps of:
    a1) identifying a first frequency and a first timeslot of the first channel;
    a2) measuring the first power level of a signal received by the CU at the first frequency and the first timeslot,
and wherein the step of generating the at least one additional power level measurement comprises the steps of:
    c11) identifying a different frequency and a different timeslot for the at least one other channel; and
    c12) generating the at least one additional power level measurement of signals received by the CU at the different frequency and the different timeslot for the at least one other channel.

8. The method as claimed in claim 6, further comprising the step of:
    f) receiving, from the control facility, the list of the candidate channels.

9. The method as claimed in claim 1, further comprising the steps of:
    b1 determining a time at which the first power level measurement is generated; and
    b2 sending the time to the control facility so that the control facility can associate the first power level measurement with the time.

10. In a wireless communication system comprising a control facility and at least one transceiver node which interfaces between multiple communication units (CUs) and the wireless communication system, a method for handing-off a CU from a first channel to a second channel, wherein the first channel and the second channel are provided to the CU by the at least one transceiver node, and the second channel is a channel which has an adequate power level at a location of the CU which enables the at least one transceiver node which is providing the second channel to provide acceptable communication service between the CU and the at least one transceiver node, the method performed by the control facility comprising the steps of:

a) identifying a need to hand off the CU from the first channel;

b) evaluating previously received power measurements which were received from the multiple CUs at at least one earlier time;

c) developing a geographic map which provides an indication of power measured by the multiple CUs as a function of the geographic location of the CU;

d) processing power measurements to determine the second channel to which the CU should hand off, wherein the power measurements represent power levels of signals transmitted to the multiple CUs from the at least one transceiver node, and the power measurements are received from the multiple CUs; and e) sending a message to the CU which includes parameters identifying the second channel so that the CU can hand off to the second channel.

11. The method as claimed in claim 10, wherein the step of identifying the need to hand off comprises the steps of:

a1) receiving, from the CU, a message which includes a request to hand off from the first channel; and a2) identifying the need to hand off the CU based on the step of receiving the message.

12. The method as claimed in claim 10, wherein the step of processing the power measurements to determine the second channel comprises the step of:

b1) determining multiple candidate hand off channels, wherein each of the multiple candidate hand off channels is a channel which has an adequate power level at the location of the CU to provide the CU with the acceptable communication service, and the second channel is one of the multiple candidate hand off channels, and wherein the step of sending the message to the CU comprises the step of:

c1) sending the parameters which describe each of the multiple candidate hand off channels, including the parameters which describe the second channel, to the CU so that the CU can determine to which of the multiple candidate hand off channels the CU will hand off.

13. A control facility for controlling power levels of at least one communication channel used by a communication unit (CU) in a wireless communication system comprising the control facility and at least one transceiver node which provides the at least one communication channel to the CU, the control facility comprising:

a receiving means for receiving power level measurements from the CU, wherein the power level measurements indicate a first power level of a signal received by the CU from a transceiver node;

a processing means, coupled to the receiving means, for processing the power level measurements to determine whether a second power level of a communication channel will enable the transceiver node which is providing the communication channel to provide acceptable communication service between the CU and the transceiver node and for developing a geographic map which provides an indication of power measured by the CU as a function of the geographic location of the CU; and a transmitting means, coupled to the processing means, for sending at least one message to a device which can affect the power level, wherein the device is from a group comprising the transceiver node and the CU.

* * * * *